United States Patent [19]

Diery et al.

[11] 4,448,992

[45] May 15, 1984

[54] ADDITION PRODUCTS FROM TRIETHANOLAMINE CONDENSATION PRODUCTS AND BISGLYCIDYL ETHERS AND THEIR USE

[75] Inventors: Helmut Diery, Kelkheim, Fed. Rep. of Germany; Bernhard Mees, Charlotte, N.C.

[73] Assignee: Hoechst Aktiengesellschaft, Fed. Rep. of Germany

[21] Appl. No.: 416,117

[22] Filed: Sep. 9, 1982

[30] Foreign Application Priority Data

Sep. 12, 1981 [DE] Fed. Rep. of Germany ....... 3136281

[51] Int. Cl.³ .................... C07C 91/08; C07C 33/08
[52] U.S. Cl. ...................... 564/347; 564/346
[58] Field of Search ............... 564/346, 347

[56] References Cited

U.S. PATENT DOCUMENTS

4,309,532   1/1982   Cuscurida et al. ............ 564/346 X

*Primary Examiner*—Paul F. Shaver
*Attorney, Agent, or Firm*—Connolly and Hutz

[57] ABSTRACT

Addition products obtained by reaction of triethanolamine condensation products of the formula 1,

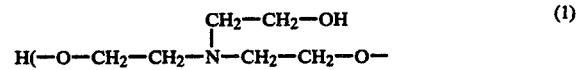

(1)

-continued

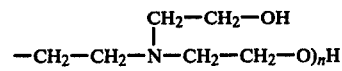

wherein n is intended to denote a number from 1 to 3, with bisglycidyl ethers of the formula 2,

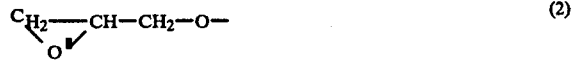

(2)

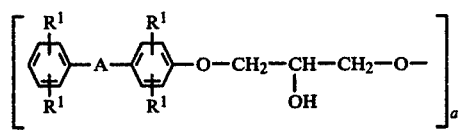

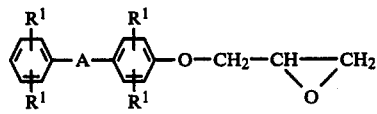

wherein $R^1$ can be identical or different and denote hydrogen, $C_1$-$C_4$-alkyl or halogen, in particular chlorine, A denotes a direct bond, a sulfonyl or cyclohexyl group or a group of the formula

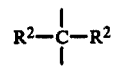

wherein $R^2$ denotes hydrogen, methyl or phenyl and a denotes a whole number from 0 to 10, and their use as demulsifiers for oil-water emulsions, as lubricants and as paper auxiliaries.

2 Claims, No Drawings

ADDITION PRODUCTS FROM TRIETHANOLAMINE CONDENSATION PRODUCTS AND BISGLYCIDYL ETHERS AND THEIR USE

It is known that triethanolamine is employed with good results in formulations of manufacturers of cleaning materials and also in the area of corrosion protection. It is likewise known that triethanolamine in the presence of catalytic amounts of Lewis acids, such as, for example $ZnCl_2$, can condense with itself, water being split off. When up to 1 mole of water per mole of triethanolamine is split off, a highly viscous paste is obtained, which is still soluble in water and also forms highly viscous solutions in water. In spite of this high viscosity, the degree of condensation and the molecular weight achieved thereby are relatively low. The molecular weight obtained in this process is about 650–750. Products of this type show a certain effect in the areas of paper finishing, in separating oil-in-water emulsions and in lubricants. However, it is a disadvantage for the areas of use mentioned that the molecular weight of the triethanolamine condensation product is still too low. If an attempt is made to increase the condensation beyond the extent mentioned of 1 mole of water per mole of triethanolamine, the reaction product passes through an extremely viscous gel phase which can no longer be technically controlled and a polycondensation product, which is completely insoluble in water, is obtained.

These findings show that it is not technically possible by direct continuation of condensation to obtain triethanolamine condensation products having a higher molecular weight and greater possibilities of application.

It has now been found that industrially valuable condensation products having a higher molecular weight are obtained when the triethanolamine condensation products are reacted with bisglycidyl ethers.

Thus the invention relates to addition products obtained by reacting triethanolamine condensation products of the formula 1,

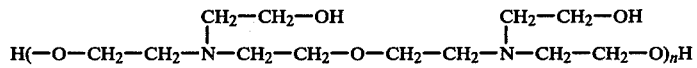

wherein n is intended to denote a number from 1 to 3, with bisglycidyl ethers of the formula 2,

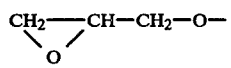 (2)

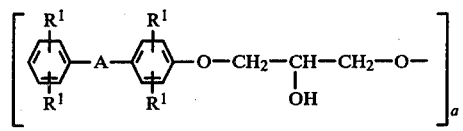

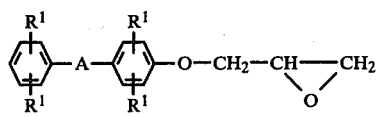

wherein $R^1$ can be identical or different and denote hydrogen, $C_1$–$C_4$-alkyl or halogen, in particular chlorine, A denotes a direct bond, a sulfonyl or cyclohexyl group or a group of the formula $$R^2-\underset{|}{\overset{|}{C}}-R^2$$

$R^2$ denotes hydrogen, methyl or phenyl and a denotes a whole number from 0 to 10.

The triethanolamine condensation products employed are those products which still dissolve in water to give a completely clear solution. The viscosity of a 40% strength aqueous solution should be between 30–1,500 mPa.s, preferably between 100–1,000 mPa.s (measured in a falling sphere viscometer). The condensation itself is carried out in a manner known in itself by acid catalysis at temperatures between 180°–230° C., it being expedient to distil out the water of reaction using a stream of nitrogen.

The bisglycidyl ethers are obtained in a known manner from the corresponding bisphenols. The bisphenols below are suitable, amongst others, for this purpose: bis(4-hydroxyphenyl)methane, bis(4-hydroxy-3-methylphenyl)methane, bis(4-hydroxy-3,5-dichlorophenyl)methane, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3,5-dichlorophenyl)propane, bis(4-hydroxyphenyl)phenylmethane, bis(4-hydroxyphenyl)diphenylmethane, 1,1-bis(4-hydroxyphenyl)cyclohexane, 4,4'-dihydroxybiphenyl and 4,4'-dihydroxydiphenyl sulfone.

In addition, epoxy resins are also suitable as bisglycidyl ethers in accordance with the formula given above.

The reaction of the triethanolamine condensation products with the bisglycidyl ethers occurs at temperatures between 70°–160° C., preferably between 80°–120° C. The reaction is generally carried out without a solvent, but it is also possible to carry out the reaction in a suitable solvent. This is particularly advisable when the viscosities of the reactants and the final product are too high in the undiluted state.

The molar ratio of the triethanolamine condensation products to the bisepoxide is 1:0.5 to 1:0.05, the upper limit of the amount of bisepoxide used being dependent on the viscosity and thus on the molecular weight of the condensation products employed. The higher the molecular weight of the condensation product is, the lower should the added amount of the epoxide be, since, otherwise, final products are obtained which, due to cross-linking reactions, are gel-like and no longer soluble in water.

The bisepoxide employed can be added either at once or in several portions, or if it is liquid, it can be added dropwise continuously during the reaction time. An additional catalyst is not necessary for the reaction and the reaction time depends on the reaction temperature. The reaction is continued until an epoxide number smaller than 2 is reached.

The products thus obtained are very well suited as separators of water and oil emulsions, as lubricants of machine parts and as paper auxiliaries.

The following examples are intended to illustrate the invention, but without restricting it.

EXAMPLE 1

298 parts by weight of triethanolamine were placed together with 3 parts by weight of powdered zinc chloride in a 1 liter four-neck flask having a stirrer, thermometer and short-path distillation head and then heated up to 230° C. with stirring. The water produced in the reaction was removed via the short-path distillation head by passing through a gentle stream of nitrogen. The reaction was allowed to continue until about 35.5 g of distillate had separated (about 5 hours). The product was still soluble in water and had a viscosity of 32 Pa.s at room temperature, measured directly (i.e. not diluted in water).

30 parts by weight of the bisglycidyl ether of bisphenol A, having a molecular weight of 384, were added to this condensation product from a dropping funnel at 100° C. in the course of 1 hour and the mixture was allowed to stir a further 2 hours at this temperature. The epoxide number should then be about 2. The final product had a viscosity of 40 mPa.s, as a 40% strength aqueous solution, and was completely homogeneous.

EXAMPLE 2

298 parts by weight of triethanolamine were condensed as described in Example 1 until a sample had a viscosity of 66 Pa.s in the undiluted state (at room temperature).

Then 10 parts by weight of the bisglycidyl ether of bisphenol A mentioned in Example 1 were added at 50° C. and the mixture was heated to 100° C. within 30 min. Thereafter, the mixture was maintained at this temperature, with stirring, for a further 2 hours. A readily pourable brown liquid was obtained which had a viscosity of 1,350 mPa.s when diluted with water to 40% by weight.

EXAMPLE 3

A triethanolamine condensation product having a viscosity of 66 Pa.s was prepared in accordance with Example 1. The very viscous product was diluted with 60 parts by weight of methoxybutanol and 8 parts by weight of an epoxy resin of the formula 2

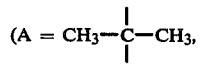

a=5-6, epoxide number 39) were added at room temperature. The mixture was then maintained at 105°-110° C. for 4 hours in a pressure vessel, with stirring, and then cooled down to room temperature again. After the addition of 200 parts by weight of water, the methoxybutanol was distilled off and, after adjusting the condensation product to 40% by weight with water, a brown liquid was obtained which had a viscosity of 1,500 mPa.s.

EXAMPLE 4

38 parts by weight of the bisglycidyl ether of 2,2-bis(4-hydroxyphenyl)propane were added to 260 parts by weight of a triethanolamine precondensation product in accordance with Example 1, having a viscosity of 32 Pa.s, and the mixture was stirred at 70° C. for 6 hours. The epoxide number had then decreased to 3-2 and the batch was adjusted with water to 40% by weight of active substance. The viscosity of this adjusted solution was 100 mPa.s.

EXAMPLE 5

298 parts by weight of triethanolamine were condensed with 3 parts by weight of zinc chloride at 230° C. until the viscosity was 20 Pa.s at 20° C. Then 35 parts by weight of the bisglycidyl ether of 4,4'-dihydroxydiphenyl sulfone were added and crosslinked at 110° C. for 4 hours. The final product had a viscosity of 500 mPa.s as an aqueous solution adjusted to 40% strength.

We claim:

1. An addition product obtained by reaction of a triethanolamine condensation product of the formula 1,

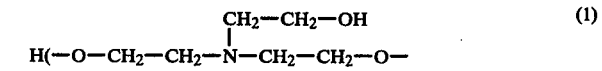

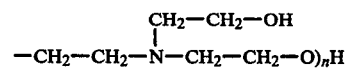

wherein n denotes a number from 1 to 3, with a bisglycidyl ether of the formula 2,

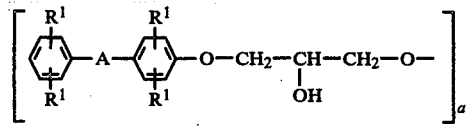

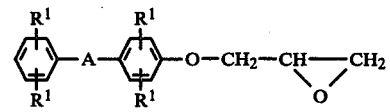

wherein $R^1$ can be identical or different and denote hydrogen, $C_1$-$C_4$-alkyl or halogen, A denotes a direct bond, a sulfonyl or cyclohexyl group or a group of the formula

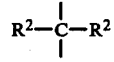

$R^2$ denotes hydrogen, methyl or phenyl and a denotes a whole number from 0 to 10.

2. An addition product according to claim 1, wherein, in the bisglycidyl ether of formula (2), $R^1$ is chlorine.